United States Patent [19]

Heitmann

[11] 4,415,938
[45] Nov. 15, 1983

[54] METHOD AND SYSTEM FOR ERROR CORRECTION IN DIGITAL VIDEO SIGNAL RECORDING

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 319,786

[22] Filed: Nov. 9, 1981

[30] Foreign Application Priority Data

Dec. 1, 1980 [DE] Fed. Rep. of Germany ....... 3045226

[51] Int. Cl.³ .......................... G11B 5/09; G11B 27/36
[52] U.S. Cl. ........................................ 360/53; 360/31
[58] Field of Search .................................. 360/53, 31

[56] References Cited

U.S. PATENT DOCUMENTS

| | | | |
|---|---|---|---|
| 3,337,859 | 8/1967 | Yoshii | 360/53 |
| 3,434,156 | 3/1969 | James | 360/53 |
| 3,510,857 | 5/1970 | Kennedy et al. | 360/53 |
| 3,653,011 | 3/1972 | Donohue et al. | 360/53 |
| 3,810,236 | 5/1974 | Horowitz et al. | 360/53 |

Primary Examiner—Vincent P. Canney

Attorney, Agent, or Firm—Frishauf, Holtz, Goodman & Woodward

[57] ABSTRACT

To correct erroneously recorded video data, or other data which have periodically recurring gaps or intervals in the data stream, the data are applied to two channels, one channel applying the data to a recording head (2) on the tape, and immediately thereafter reproduction by a reproducing head (4); the second channels applies the data to a time delay circuit (14) which has a delay time corresponding to the time interval between recording/reproduction in the first channel. The time-delayed original data in the second channel are compared with the reproduced data in the first channel by a correlator (13), and if the comparison indicates inconsistency, the time-delayed data are stored, for example in a random excess memory (RAM) 23, and re-recorded upon recall from the RAM 23 during a recording interval or gap, as determined by a control signal applied to a transfer switch (6) in series circuit with the recording head (2). Substantial deviation between the data in the first and second channel can also be indicated by integrating an output signal from the correlator (13) representative of errors, and providing an alarm output (27, 28) if a certain alarm threshold reference is exceeded.

7 Claims, 3 Drawing Figures

METHOD AND SYSTEM FOR ERROR CORRECTION IN DIGITAL VIDEO SIGNAL RECORDING

The present invention relates to a system and to a method to correct errors which arise in the recording and reproduction of digitally coded video signals, in which the video signals are magnetically recorded on a magnetic carrier, such as a tape which, for example, is spirally wound about a tape transducer drum or cylinder.

BACKGROUND

Errors arise in the recording of digital signals on a magnetic record carrier, such as a tape, which are usually due to mechanical discontinuities or faults on the surface of the recording medium, or due to changes in distance between a transducer, carried by a head wheel, in the recording apparatus from the surface of the magnetic medium, such as a tape. Such faults in the tape, or changes in distance between the recording head and the tape at incremental areas causes drop-outs and, consequently, loss of information in the particular area where the fault or change in distance occurred.

Magnetic storage of digitally coded video signals cause, frequently, at the point of drop-outs, false information regarding picture brightness. Scattered over the image which is reproduced, bright or dark portions of lines may occur which, due to their contrast, are annoying to the viewer with respect to the undistorted image content.

Various methods and systems have been proposed to cover errors and defects, and to effect correction, so that the effect of poorly recorded or non-recorded data are eliminated or, at least, ameliorated.

In one system, which has frequently been used, the stream of data which is received are recorded in a redundant recording system in order to be able to have a second, hopefully perfect recording available which may be resorted to. In another system, which also has been used, additional test words or bits are recorded in additional test tracks, from which the reproduction of defective data can be recognized, and the correct bits reconstructed.

A common disadvantage of the two above referred to methods and systems for correction of digitally coded data which are improperly recorded is that a substantial portion of the storage surface on the magnetic carrier is used to record redundant data or test data, respectively, and that this area thus is not available for the storage of the data which actually are to be reproduced. The storage density, thus, on the carrier is not an optimum.

Storage and transformation of video signals may also use a different type of method in order to improve reproduction in a magnetic transducer system using digitally coded data. This method is used primarily in the transmission of video signals. The above methods employ the characteristics of video signals that the video signal itself contains some redundancy. In a normal case, the information content of sequential video field lines is small; the difference between sequential frames likewise is small. In the circuits to carry out coverage of errors, the image content, after a time delay, provides a prognosis of the subsequent image content to be expected; if the actually received image content substantially deviates from the expected image content, then the preceding line, or at least a portion thereof, is repeated, and an average value is obtained by interpolation of the preceding line and the subsequent, apparently defective line, or portion thereof. This average value then replaces the data word or data blocks which are outside of the expected range of data. These systems and methods decrease the visible effects of errors in data in the transmission chain. The errors, themselves, are not eliminated and their consequences are not completely removed.

THE INVENTION

It is an object to improve the storage, for subsequent reproduction, of data, and particularly digitally coded video data, in which errors in initial recording are, effectively, eliminated, without materially affecting the storage or packing density of data on the record carrier, and which is simple and readily constructed using commercially available circuit elements.

Briefly, the data are applied to a first channel and recorded on the medium. Simultaneously, the data are applied to a second channel. Immediately after reading-out the recorded data in the first channel, the data are reproduced using a transducer which is independent of the recording transducer. The reproduced data are compared with the same data, time delayed in the second channel. The time period of delay is matched to the time taken between recording and read out of the first recorded data in the first channel. If the comparison indicates inconsistencies, the time delayed data are stored in a freely addressable memory, for example a random access memory (RAM) and are re-recorded during the gaps or intervals of the stream of data which form succeeding trains or words, for example during the interval in the stream of data required for flyback or retrace of the recording beam.

The system and method has the advantage that only those portions of data are recorded redundantly in which the initial recording is erroneous. The redundant recording, advantageously, can then be carried out in the periodically occurring gaps or intervals of the stream of data. The recording density thus is not undesirably affected.

Not all the data are recorded redundantly; only the occasionally occurring redundant recording is highly effective since loss of data is prevented by use of a customary error protection method and system without, however, requiring a second complete redundancy system.

DRAWINGS

Figure 1:
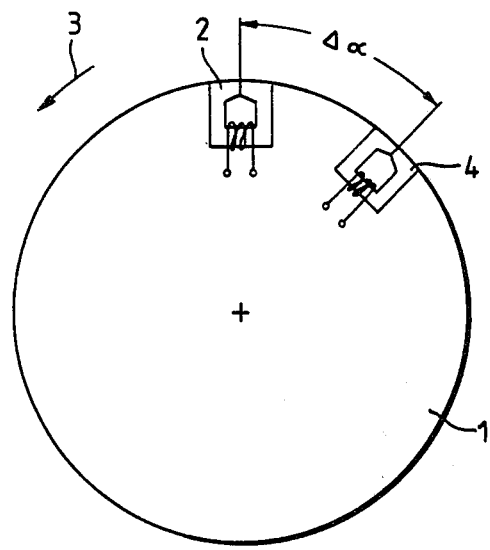
FIG. 1 is a highly schematic top view of a head wheel of a spiral-track recording magnetic tape apparatus illustrating the system used in carrying out the present invention.

The head wheel 1 of a spiral-track recording apparatus is of the type generally used in magnetic tape recording systems for video recording. The magnetic tape is wrapped spirally about a drum within which the head wheel rotates, so that the magnetic tape will have a sequence of diagonal tracks recorded thereon. The head wheel 1 has at least one, and usually two magnetic transducer heads 2 located thereon, to which electrical signals are transduced for recording on or reproduction from a magnetic tape—not shown. The head wheel rotates at high speed in the direction of the arrow 3, the magnetic tape being spirally guided around the circumference of the head wheel 1 by being placed on a cylinder formed with a narrow gap within which the head wheel rotates.

In many instances, it is desirable to supervise the information recorded on the magnetic tape as it is being recorded. This prevents that, due to technical errors or errors in operation, information is lost without the loss being discovered. To determine what has been recorded, that is, to monitor the original recording, a second magnetic transducer head 4 is located on the head wheel in contact with the tape, offset with respect to the main recording head 2 by an angle $\Delta \alpha$. Further, it is offset axially with respect to the transducer head 2 so that it will scan the track recorded by the transducer head 2. A similar arrangement may be placed, symmetrically, 180° offset on the head wheel 1, and suitable measures are taken so that it will be dynamically balanced.

The transducer 2 is, during recording, connected with the recording circuit of the magnetic recording apparatus; the transducer 4 is connected to the reproduction network. The data recorded by the transducer 2 are thus read-out or reproduced by the transducer 4, with a short time delay, and thus the data, as recorded, can be monitored.

Figure 2:
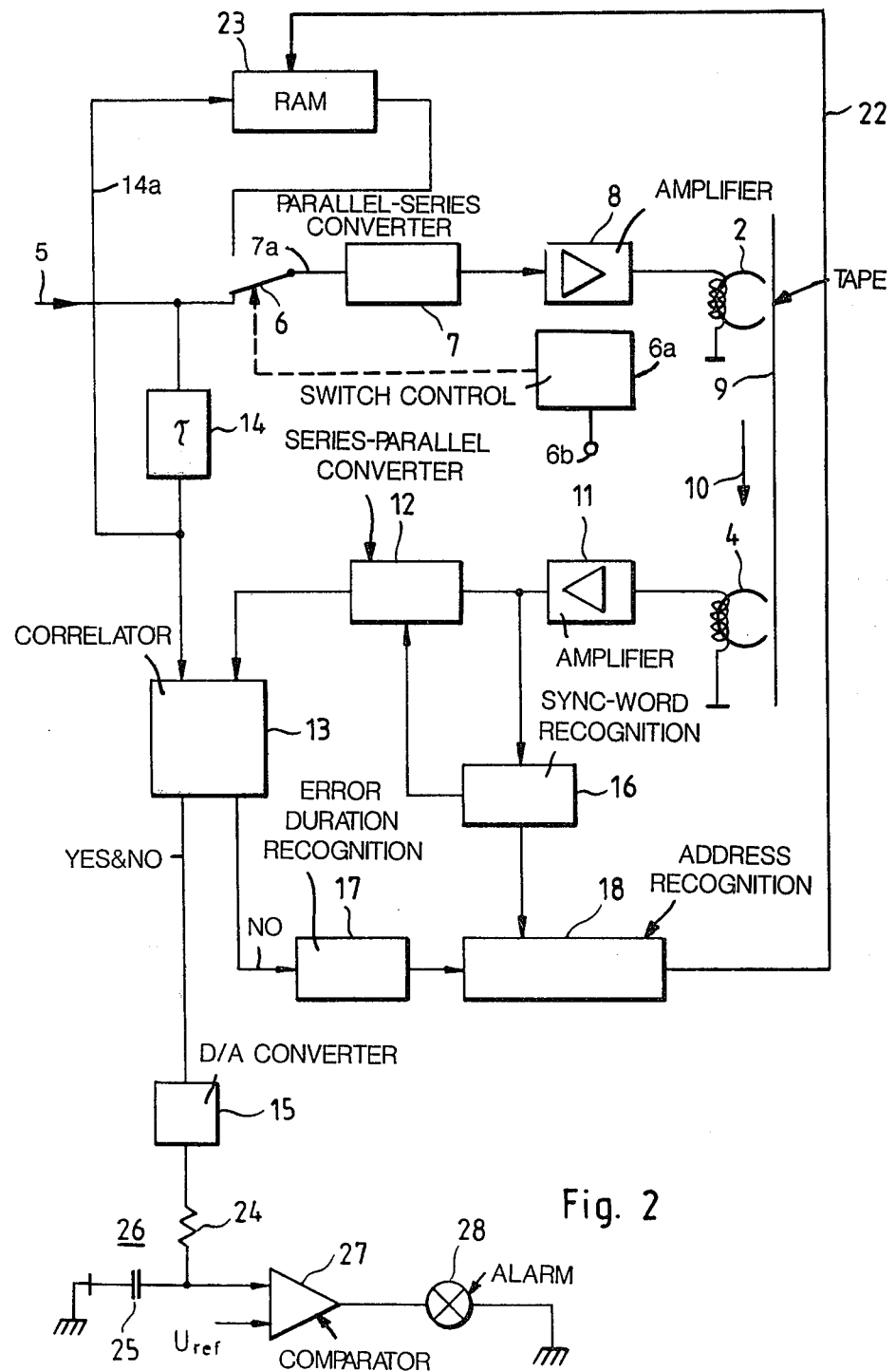
FIG. 2 is a general circuit diagram.

The circuit—see FIG. 2—receives, in parallel, a stream of data over cable 5; the data stream, in which words are supplied in parallel, the words, themselves, being sequential, is connected over a transfer switch 6 and over cable 7a to a parallel-series converter 7 for transfer into a serial stream of data which, then, are amplified in amplifier 8 and applied to the recording transducer 2, for recording on a tape 9. Tape 9 moves in the direction of the arrow 10. The transducer head 2, just like the second transducer head 4, can be located on a head wheel 1, as seen in FIG. 1. The reproducing transducer 4 thus receives the data, time delayed by a time $\Delta T$, corresponding to the spatial offset $\Delta \alpha$ (FIG. 1) of the transducer head 4. The data read-out or reproduced by reproducer head 4 are amplified in reproduction amplifier 11, reconverted into parallel data in the series-parallel converter 12, and applied to one input of a correlator or comparator 13. The data which were received over cable 5 are time-delayed in time delay circuit 14, which has a delay time $\tau$ corresponding to the time offset $\Delta T$ between recording by head 2 and reproduction by reproducing head 4. The time-delayed data, thus, are applied to the correlator 13 from cable 5 through time delay 14 to arrive at the correlator at the same time as the reproduced or read-out data from the reproducing head 4. Correlator 13 can be an integrated circuit, for example of the type TRW TDC 1023.

In accordance with the invention, thus, the data arriving at cable 5 are split into two channels: One channel is the direct recording channel via amplifier 8 and recording head 2; the other is the time delay via delay circuit 14. The first channel, after reproduction, then also includes the reproducing transducer 4, amplifier 11, and the second input to the correlator 13.

A digital/analog converter 15 connected to the output of the correlator 13 provides an output voltage which permits automatic supervision of the recording. An integrator 26, formed by a resistor 24 and a capacitor 25, is connected to the D/A converter 15. The output of the integrator is connected to a comparator 27 which receives a reference voltage $U_{ref}$ from a suitable source of reference potential. The correlator 13 is so constructed that the magnitude of the error, for example in evaluation of the most significant bits and the frequency of the errors are integrated by the integrator 26 and, if the integration output exceeds the reference value determined by the reference voltage $U_{ref}$, the comparator 27 provides an output signal which causes an alarm indicator, for example an alarm lamp, to show a substantial source of errors.

The digitally coded data, such as video data, are present in blocks of data, in which each has at least one synchronizing word and an address. To recognize the synchronizing word, a synchronizing word recognition circuit 16 is connected to the output of the amplifier 11, from which a clock signal is derived for the series-parallel converter 12.

If the correlator 13 recognizes an inconsistency, or non-concurrence between the data which are derived by the second channel, that is, time-delayed through time delay circuit 14, and the data which were recorded and reproduced in the first channel, and supplied through the chain: recording head 2—tape 9—reproducing head 4, the error recognition circuit 17 connected to the correlator 13 will provide an output which is representative of an evaluation of the time duration of the data which are improperly recorded, and read-out by the reproducing head 4. An address recognition stage 18 is connected to the output of the error duration recognition stage 17 to evaluate the addresses of the data which do not correlate, as received from the synchronization-word recognition circuit 16, the addresses being derived from the synchronization words, which are continuously recognized by the circuit 16.

The addresses of the improperly recorded data are applied over connection 22 to an auxiliary memory 23, for example a random excess memory (RAM), such that the data at the output of the time delay circuit 14 can be stored therein. Cable 14a transfers the data from the second channel, that is, specifically from the output of the time delay network 14, to the RAM 23, for reading-out or recall at an appropriate period of time. The recall is controlled by change-over of transfer switch 6 in the second position—not shown—under control of a control signal from a switch control unit 6a which receives control data from a terminal 6b. The switch is changed over at a time which causes the data from RAM 23 to be re-recorded in a gap of the stream of data. Such gaps occur upon storage of digitally coded video signals, for example during the vertical retrace interval. It is, however, also possible to make the respective track portions of the normal recording tracks slightly longer than customary, and fit the correction data at the end of the regular recording of the data on the regular tracks.

Figure 3:
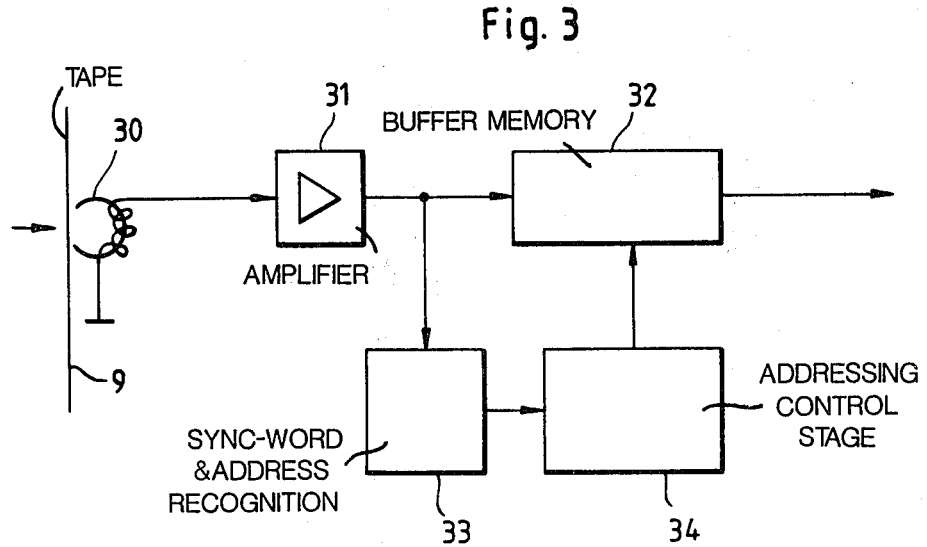
FIG. 3 is a reproduction circuit diagram, in which all elements not necessary for an understanding of the invention have been omitted.

A reproduction transducer 30—not shown in FIGS. 1 and 2, but which may be the transducer 2 of FIG. 1, suitably connected—is utilized to reproduce the electrical signals stored on tape 9—see FIG. 3. The signals from transducer 30 are raised to a suitable level by reproduction amplifier 31 and stored in a buffer memory 32. The buffer memory 32, preferably, is a freely addressable memory of the RAM type. Upon adding the correction data at the end of any one track, the storage volume must correspond to the data content of one track. Upon reading-out the correction data recorded at the end of a track, the block addresses contained in the synchronizing word of the uncorrected, erroneous data in the buffer memory 32, are writtenover and thus corrected. The synchronizing word and the block addresses contained therein are added by the synchronizing word and address recognition circuit 33, connected to the amplifier 31 and applied to the addressing control stage 34 to control the buffer memory 32. The content in the buffer memory 32, then, will be corrected content, and it can be read-out for final reproduction. Any memory cell which is read-out from the buffer memory can be immediately utilized for re-recording of subsequent data, derived from the tape 9.

Various changes and modifications may be made within the scope of the inventive concept. All stages and units can be constructed by use of well known circuit components and generally well known in video transducing technology.

I claim:

1. Method of correcting digitally coded video signals which are erroneously recorded on a magnetic recording medium (9) and wherein the data are applied in the form of a stream of data words, in which the stream of words is subdivided into a group or train of words with gaps or intervals defined by retrace gaps of the video signals between said groups or trains of words, wherein the data are recorded on magnetic tape by a rotating head wheel (1) carrying a recording transducer head (2) and a reading-out and reproduction transducer head (4), which is spatially offset ($\Delta\alpha$) with respect to the recording transducer head (2) which effects said recording of the data;

comprising the steps of applying the data to a first channel including the recording transducer head and recording the data on the tape (9);

immediately after recording the data on the tape, reading-out said data from the tape independently of the recording of the data to obtain reproduced data by deriving data from the spatially offset reproduction transducer head (4);

applying the data to a second channel;

time-delaying the data in the second channel by the time period of delay between recording and reading-out or reproducing said recorded data by a time period of delay ($\Delta T$) which corresponds to the quotient of circumferential offset ($\Delta\alpha$) of the reproducing head (4) and of the recording head (2) with respect to the circumferential speed of the head wheel (1);

comparing the time-delayed signals in the second channel with the read-out reproduced data;

and, if the comparison indicates inconsistencies, storing the time-delayed data and re-recording said data on the tape during the gaps or intervals of succeeding groups or trains of words.

2. Circuit system for correction of digitally coded data which are erroneously recorded on a magnetic recording medium (9), and wherein the data are applied in form of a stream of data subdivided into trains or groups of data words with gaps or intervals between the groups or trains, comprising, in accordance with the invention, a first transducer (2) connected for recording received data on the magnetic medium (9), and a second transducer (4) connected for reading-out or reproducing the previously recorded data, said second transducer being positioned by a distance ($\Delta\alpha$) from said first transducer;

circuit means (6, 7, 8) including a transfer switch (6) connecting received data (5) in a first channel to said first transducer;

a time delay circuit (14) connected, in a second channel, to said received data, said time delay circuit having a delay time ($\Delta T$) corresponding to the elapsed time between recording a data bit by said first transducer, and reproducing said data bit by the second transducer;

a correlation circuit (13) connected to and receiving the signals, delayed by said delay time ($\Delta T$) from the time delay circuit in the second channel and the read-out or transduced data from the second transducer (4) in the first channel, comparing and correlating said received data and providing an output if there is failure or inconsistency in the data supplied to the correlation circuit;

and a freely addressable memory (RAM) (23) connected to and receiving output from said correlation circuit (13) to store time delayed data supplied to the correlation circuit through the second channel in which there was a failure of correlation or conformity between the reproduced-read-out data from the first channel;

and means (6a, 6b) controlling said transfer switch to read-out said freely addressable memory (23) for re-recording said time-delayed data during the gap or interval between succeeding trains or groups of words on the recording medium.

3. System according to claim 2, further including a freely addressable buffer memory (32) connected to receive the data to be recorded and the time-delayed data from the second channel for additional recording in the gaps or intervals between two succeeding trains or groups of data in the stream of data.

4. System according to claim 2, further comprising a defective recording monitoring circuit including erroneous data evaluation means (15, 26, 27, 28) connected to the correlator and receiving correlated output signals, and responsive to failure of correlation above a reference level ($U_{ref}$) to provide an alarm output signal (28).

5. System according to claim 4, wherein the monitoring circuit comprises an integration stage (26) connected to receive the output from the correlator, said output signal having discrete predetermined values upon failure of correlation;

a reference source providing a reference signal ($U_{ref}$);

a comparator having the output of said integration stage (26) and said reference signal applied thereto, and providing an alarm output if the integrated non-correlating signals exceed a value determined by said reference signal for providing an output indication (28) indicative of non-correlation.

6. System according to claim 2, wherein the signals are digitally coded video signals, and said intervals or gaps are the flyback or retrace intervals between video information signals to effect recording of the time-delayed signals from the second channel in said intervals.

7. System according to claim 6, wherein said intervals are the vertical flyback or retrace intervals.

* * * * *